United States Patent
Hunt et al.

(10) Patent No.: US 9,493,356 B1
(45) Date of Patent: Nov. 15, 2016

(54) IMPREGNATION OF MACROCYCLE ORGANICS TO ACTIVATED CARBON

(71) Applicants: Joseph R. Hunt, King George, VA (US); Timothy P. Burgin, Scottsdale, AZ (US)

(72) Inventors: Joseph R. Hunt, King George, VA (US); Timothy P. Burgin, Scottsdale, AZ (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/802,988

(22) Filed: Jul. 17, 2015

(51) Int. Cl.
*B01D 53/02* (2006.01)
*C01B 31/08* (2006.01)

(52) U.S. Cl.
CPC ..................................... *C01B 31/08* (2013.01)

(58) Field of Classification Search
CPC .......................................... C01B 31/08–31/14
See application file for complete search history.

(56) References Cited

U.S. PATENT DOCUMENTS

| | | | | | |
|---|---|---|---|---|---|
| 4,358,427 | A * | 11/1982 | Urban | ..................... | F01K 21/06 423/230 |
| 4,496,371 | A * | 1/1985 | Urban | ................. | B01D 53/1418 423/221 |
| 6,007,724 | A * | 12/1999 | Kulprathipanja | ...... | B01D 15/00 210/670 |
| 6,217,839 | B1 * | 4/2001 | Hess | ................... | B01D 53/1456 423/220 |
| 2004/0178149 | A1 * | 9/2004 | Hernandez | ............... | B01J 20/20 210/688 |
| 2007/0080103 | A1 * | 4/2007 | Mitchell | ............ | B01D 39/2058 210/263 |
| 2007/0295347 | A1 * | 12/2007 | Paine | ..................... | A24D 3/163 131/342 |
| 2011/0308524 | A1 | 12/2011 | Brey et al. | ................ | 128/205.12 |
| 2013/0001169 | A1 * | 1/2013 | Hernandez | ........... | B01J 20/3285 210/688 |
| 2013/0168321 | A1 * | 7/2013 | Cannon | ..................... | B01J 20/20 210/684 |
| 2014/0010714 | A1 * | 1/2014 | Sugimoto | .......... | B01D 53/8675 422/122 |
| 2014/0208950 | A1 | 7/2014 | Giurgiutiu et al. | .. | G01N 27/026 |
| 2015/0105250 | A1 * | 4/2015 | Weston | .................. | B01J 20/226 502/401 |

OTHER PUBLICATIONS

MIL-PRF-32016(EA) Performance Specification: Cell, Gas Phase, Adsorber (2002) https://www.wbdg.org/ccb/FEDMIL/prf32016a.pdf.
MIL-DTL-32101 Detail Specification: Carbon, Activated, Impregnated, Copper-Silver-Zinc-Molybdenum-Triethylenediamine (ASZM-TEDA) (2002) https://www.wbdg.org/ccb/FEDMIL/dtl32101.pdf.
K. Kadish et al. eds.: *The Porphyrin Handbook*, v. 6, §41 (2000) Academic Press. http://www.scs.illinois.edu/suslick/documents/porphmaterials.medres.pdf.

* cited by examiner

*Primary Examiner* — Christopher P Jones
(74) *Attorney, Agent, or Firm* — Gerhard W. Thielman, Esq

(57) ABSTRACT

A filtration material is provided for incorporation in a gas filter that includes an Activated Carbon, Impregnated with Copper, Silver, Zinc, Molybdenum, and Triethlyenediamine (ASZM-TEDA) medium and a macrocyclic organic material. The material is impregnated into the medium in proportions of between 1% and 5% of the medium. The material consists of molecules, each with a binding pocket for binding a metal ion. Also, a method is provided for impregnating porphyrin into a medium of ASZM-TEDA for incorporation in a gas filter. The method includes mixing porphyrin and ASZM-TEDA in a first ratio-by-weight of 1:4 of porphyrin to ASZM-TEDA as a mixture in a container; adding dichloromethane to the mixture in a second ratio-by-weight of 1:133 of porphyrin to dichloromethane as a solution in the container; stirring and refluxing the solution under nitrogen, filtering said mixture from the solution as a carbon residue; and drying the residue.

6 Claims, No Drawings

IMPREGNATION OF MACROCYCLE ORGANICS TO ACTIVATED CARBON

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to mitigation of metal salt migration in carbon filters. In particular, the invention relates to using porphyrin impregnation to trap metal ions to inhibit their movement and chemical interaction within the filter.

Impregnated carbon is incorporated into filters designed for gas masks to protect respiratory systems from contamination. Activated Carbon, Impregnated with Copper, Silver, Zinc, Molybdenum, and Triethlyenediamine (ASZM-TEDA) constitutes a filtration material used in conjunction with standards MIL-DTL-32101A and EA-C-1704 (Army).

The compound material ASZM-TEDA constitutes an adsorbent conventionally used in the military's chemical and biological protection systems to capture and destroy chemical threats. ASZM-TEDA consists of an activated carbon with metal salts adsorbed into the pores to provide the reactivity towards chemical weapon agents. The carbon (C) adsorbs the threat agents and the metal salts neutralizes these threats by chemical reaction. After three or four years of service life, the carbon becomes less effective at stopping particular chemical threats, especially those with higher volatility. Such threats include blood agents including hydrogen cyanide (HCN) and cyanogen chloride (CNCl).

Hydrogen cyanide has NATO weapon designation "AC", being an organic compound called prussic acid. AC is a colorless, extremely poisonous liquid that boils at slightly above room temperature at 25.6° C. (78.1° F.), and is produced on an industrial scale as a highly valuable precursor to many chemical compounds ranging from polymers to pharmaceuticals.

Cynogen chloride has NATO weapon designation "CK" and is a corrosive, colorless gas at low temperatures, readily condensable into a clear, colorless liquid with an irritating, pungent odor. CK dissolves slowly in water, reacting therewith to form hydrogen chloride (HCl) gas. CK has a molecular weight of 61.47, which translates to a vapor density of 2.12, thereby sinking in air to collect in low spots and confined areas. CK boils at 13.8° C. (56.84° F.), freezes at −6.0° C. (21.2° F.), and evaporates rapidly in contact with exposed water. CK has the additional hazard of being able to polymerize, usually explosively.

SUMMARY

Conventional ASZM-TEDA (active carbon) filters yield disadvantages addressed by various exemplary embodiments of the present invention. In particular, a filtration material is provided for incorporation in a gas filter that includes an Activated Carbon, Impregnated with Copper, Silver, Zinc, Molybdenum, and Triethlyenediamine (ASZM-TEDA) medium and a macrocyclic organic material. The material is impregnated into the medium in proportions of between 1% and 5% of the medium. The material consists of molecules, each with a binding pocket for binding a metal ion.

Other various embodiments provide a method for impregnating porphyrin into a medium of ASZM-TEDA for incorporation in a gas filter. The method includes mixing porphyrin and ASZM-TEDA in a first ratio-by-weight of 1:4 of porphyrin to ASZM-TEDA as a mixture in a container; adding dichloromethane to the mixture in a second ratio-by-weight of 1:133 of porphyrin to dichloromethane as a solution in the container; stirring and refluxing the solution under nitrogen, filtering said mixture from the solution as a carbon residue; and drying the residue.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

The disclosure generally employs metric units with the following abbreviations: length in centimeters (cm), mass in grams (g), volume in milliliters (ml), and temperature in degrees Celcius (° C.). Supplemental measures can be expressed derived from these, such as density in grams-per-cubic-centimeters ($g/cm^3$) and the like.

Porphyrins are a group of heterocyclic macrocycle organic compounds, composed of four modified pyrrole subunits interconnected at their α-carbon atoms via methine bridges. Porphyrins are the conjugate acids of ligands that bind metals to form complexes. The metal ion usually has a charge of 2+ or 3+.

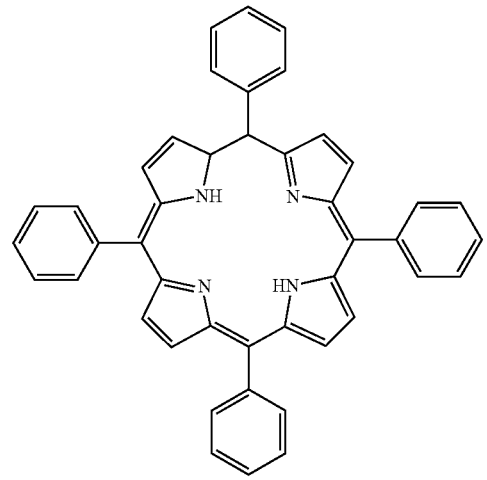 [SMILES: C1=C/C2=C(\c3ccccc3)c3ccc([nH]3)/C(c3ccccc3)=C3/C=CC(=N3)C(c3ccccc3)C3C=C/C(=C(\c4ccccc4)C1=N2)N3]

Porphyrin chemical structural formula

Utilizing impregnation to restrict metal migration in activated carbon materials extend their reactive life. Various exemplary embodiments modify ASZM-TEDA through impregnation of organic molecules such as porphyrins into porous materials to stop the migration of metal salts in the porous structure. This disclosure also describes a novel modified carbon formulation impregnated with porphyrins produced from the aforementioned process that displays these migration inhibition properties. The preferred amount of loading for the exemplary formulation is between 1% and 5% by weight, but these values are exemplary and not limiting. This modified formulation performs better than conventional configurations because exemplary embodiments mitigate the migration of the metal salts seen with conventional formulations.

Degradation of the carbon filter's activity is presumably due to migration of the reactive metal salts from changes in humidity. As the salts are dissolved in and redeposited from condensed water on the filter, they form aggregates with reduced chemical reactivity, limiting the filter's ability to capture and degrade certain chemical agents. Inhibiting this migration of metal salts towards the surface of the carbon extends the reactive life of the materials.

Exemplary embodiments provide modified ASZM-TEDA that is impregnated with porphyrins, which are macrocyclic organic compounds, each with a binding pocket in the center of the molecule. This binding pocket complexes with metal ions. Exemplary embodiments add porphyrin to bind with the metal salts of copper (Cu) and zinc (Zn) in the pocket. Because porphyrin is not water soluble, these salts cannot move through the carbon because they would be bound by the porphyrin, thereby extending the life of the carbon filters.

Other organic molecules could be used as migration inhibitors including phthalocyanines, crown ethers, naphthalene derivatives, perylene derivatives, phenanthrolines, and any other highly conjugated large organic molecules that would adsorb strongly to the carbon and have low water solubility. Exemplary embodiments also include impregnating porous materials with porphyrins and phthalocyanines that are already bound to metal ions such as copper and zinc before being disposed into the carbon materials to form additional formulations.

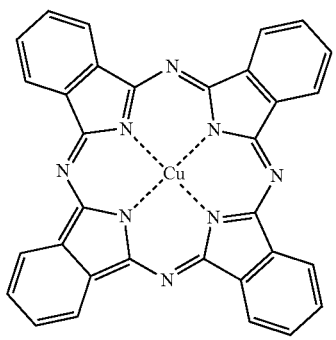

Phthalocyanine chemical structural formula

The material phthalocyanine is an intensely blue-green-coloured aromatic macrocyclic compound that is widely used in dyeing. Phthalocyanines form coordination complexes with most elements of the periodic table. Phthalocyanine forms upon heating derivatives of phthalic acid that contain nitrogen functional groups. Pthalic acid is an aromatic dicarboxylic acid with formula $C_6H_4(CO_2H)_2$.

The utility of materials such as porphyrin and phthalocyanine has been to trap atoms of select metal elements to inhibit salts from accumulating and migrating in the filter. This effect has been demonstrated through water migration testing in which the exemplary modified and conventional unmodified ASZM-TEDA media were exposed to water over seven days and then analyzed using scanning electron microscopy and electron dispersive X-ray measurements. These data indicate that a substantial amount of copper and zinc migrates to the surface of conventional ASZM-TEDA, with only minute copper or zinc visible on the surface of the porphyrin-modified ASZM-TEDA. For alternate exemplary embodiments, the modified ASZM-TEDA can be utilized in conventional processes, while depositing the substrate into layered beds of carbon inside large collective protection filters or small individual filters.

The primary proposed utility for the exemplary modified carbon filter concept involves collective protection systems used by the Defense Department (DoD). These systems protect buildings and ships from chemical attacks and utilize ASZM-TEDA. Extending the life of ASZM-TEDA could provide a significant cost savings for the DoD. The commercial potential would involve all the present applications of reactive carbons such as chemical and biological protection systems as well as water purification. The impregnated carbons could lengthen reactive lives of such filtration materials. The material is expected to have the same chemical protection capabilities as ASZM-TEDA, but without exhibiting the migration or movement of metal ions observed with conventional ASZM-TEDA. Replacing conventionally fielded filters with the exemplary formulation enables the extension of the service life of the filters from four years to at least five years, representing a large cost savings as a typical collective protection filter set costs around $1300, and a typical system contains at least 60 to 120 filters.

Only a slight modification is involved to provide these life-extension advantages for carbon filters while enabling the reactive properties of the ASZM-TEDA to remain unchanged. This obviates validation testing required to demonstrate the effectiveness of the filtration material. The simplicity of the impregnation process is also advantageous, because it requires minimal modifications to the manufacturing procedures of ASZM-TEDA. The advantages from the exemplary embodiments include improved protection against metal migration and longer filter life, requiring a very small amount of impregnant to achieve very good performance. Less than 5% of the porphyrin by weight-pergram carbon is expected to achieve the desired results based on non-optimized results. These advantages can be achieved without developing completely novel reactive adsorbents, which would require extensive research.

As an example for impregnation, one weighs 0.125 g of porphyrin and 0.5 g of ASZM-TEDA, both deposited into a three-neck round-bottom flask with a stir bar and water condenser attached. A volume of 100 ml of dichloromethane ($CH_2Cl_2$) is added to the flask, and the reaction is stirred and refluxed for 12 to 24 hours under nitrogen ($N_2$). Refluxing involves boiling the solution at the solvent's boiling point 39.6° C. for dichloromethane, while continuously recondensing the solvent vapor into liquid and draining the liquid back to the boiling solution. The carbon mixture is then filtered using a fritted funnel and the collected carbon is dried in an oven at 125° C. overnight (or approximately 12 hours). After the impregnation procedure most of the porphyrin remains in solution, with only 1-5% by weight (based on carbon) being incorporated into the carbon.

These measures are exemplary and artisans of ordinary skill will recognize that different proportions can be employed without departing from the scope of the claims. By weight, a ratio of 1:4 porphyrin and ASZM-TEDA are mixed together. Because the added dichloromethane has a density of 1.33 g/cm³, the ratio by weight of the flask solution is 1:4:133 between porphyrin, ASZM-TEDA and dichloromethane.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A filtration material for incorporation in a gas filter, said material comprising:
   an Activated Carbon, Impregnated with Copper, Silver, Zinc, Molybdenum, and Triethlyenediamine (ASZM-TEDA) medium; and
   a macrocyclic organic material in proportions of between 1% and 5% by weight of said medium, said material consisting of molecules, each with a binding pocket for complexing a metal ion, wherein said material is impregnated into said medium.

2. The filtration material according to claim 1, wherein said macrocyclic organic material is porphyrin having a structural formula:

3. The filtration material according to claim 1, wherein said macrocyclic organic material is phthalocyanine having a structural formula:

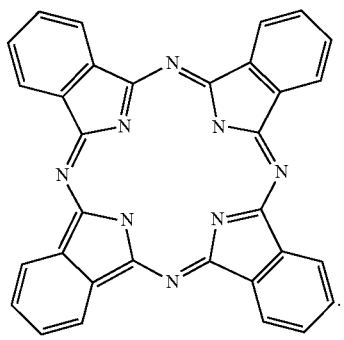 [SMILES: c1ccc2c(c1)-c1nc-2nc2[nH]c(nc3nc(nc4[nH]c(n1)c1ccccc41)-c1ccccc1-3)c1ccccc21]

4. The filtration material according to claim 1, wherein said macrocyclic organic material is additionally deposited on an outer surface of said medium.

5. The filtration material according to claim 1, wherein said metal ion has a valance charge of one of 2+ and 3+.

6. The filtration material according to claim 1, wherein said metal ion is one of Copper and Zinc.

* * * * *